United States Patent [19]

Jessup

[11] 4,206,390

[45] Jun. 3, 1980

[54] LOGIC CONTROL FOR POWER OPERATED DOOR

[75] Inventor: Frank L. Jessup, New Whiteland, Ind.

[73] Assignee: John Fulling, Greenwood, Ind. ; a part interest

[21] Appl. No.: 914,679

[22] Filed: Jun. 12, 1978

[51] Int. Cl.² ............................................ H02P 1/04

[52] U.S. Cl. .................................. 318/469; 307/119; 361/179

[58] Field of Search ........ 318/265, 266, 267, 466–469, 318/484, 488, 548, 549, 551; 307/119, 132 R, 132 EA, 132 M, 134, 139, 142, 326, 328; 361/179, 192, 191

[56] References Cited

U.S. PATENT DOCUMENTS

| | | | |
|---|---|---|---|
| 3,651,332 | 3/1972 | Cochran | 307/119 |
| 3,662,229 | 5/1972 | Graff et al. | 361/179 |
| 3,891,909 | 6/1975 | Newson | 318/469 |

*Primary Examiner*—Gene Z. Rubinson
*Attorney, Agent, or Firm*—Gust, Irish, Jeffers & Hoffman

[57] ABSTRACT

The control includes approach and safety mat switches to which are applied alternating current voltage. Each of the switches are coupled to respective high gain binary output, solid-state amplifiers which change state upon alternation of two different input voltages being compared. Upon closure of the approach mat switch, the corresponding binary amplifier is caused to change state which in turn changes the state and output signal of a third like amplifier. This output signal causes the energization of an electric motor which opens the door. Opening of the approach mat switch followed by closing of the safety mat switch, the corresponding amplifier changes state and holds the third amplifier in its state which causes energization of said motor, thereby holding the door open. A time delay circuit is connected to the third amplifier for delaying the change of state of the third amplifier after the approach and safety mat switches are opened.

To safeguard against the door being opened when the safety mat is stepped on first, an inhibit signal is coupled from the safety mat circuit to the approach mat circuit, disabling the latter.

16 Claims, 2 Drawing Figures

LOGIC CONTROL FOR POWER OPERATED DOOR

BACKGROUND OF THE INVENTION

1. Field of the Invention

The present invention relates to power operated doors and more particularly to logic circuitry for controlling the opening and closing thereof.

2. Description of the Prior Art

Power operated doors are conventionally equipped with entry and exit mats which respectively close switches when either or both of the mats is stepped on. It is conventional to use direct current voltage applied to the mat switches which eventually causes electrolysis of the contacts, an increase in contact resistance resulting. Also, it is conventional to use high current AC which causes contact sparking. Contact resistance is also affected by reason of contamination due to corrosive atmosphere, water and other residue. When the contact resistance becomes too high, the mat switches become ineffective in controlling the door-operating mechanism.

It is customary to consider the contact resistance in a mat switch as being operable if it is less than 300 ohms. However, the sensitivity of the door-opening mechanism has not been sufficiently reliable to assure consistent door operation should the contact resistance be above, for example, 100 ohms. In successive operations, the door-opening mechanism will activate, in others it will not. Prior art systems have fixed time delay of approximately 1½ second.

Also, there are "solid state" prior art devices that do not have a sharp resolution feature; therefore, they have uncertain time delay periods and annoying propagation delay upon initial activation.

Prior art systems customarily utilize relay type switches in the mechanism which are not only large and expensive but require relatively large amounts of power to operate. Further, they fail to inhibit and hold due to contacts not making good contact.

SUMMARY OF THE INVENTION

This invention relates to an automatic-door controlling apparatus comprising a first source of alternating current voltage. A normally opened approach mat switch is in series with this source. A first binary output voltage-comparing means has two differential voltage input circuits and an output circuit and generates alternatively high and low output voltages in response to two alternated high and low input control voltages. A first voltage circuit applies a first set of two input control voltages of different amplitude to this first binary means in response to the approach switch being opened and applies a second set of two input control voltages of reversed amplitude with respect to the first set in response to closure of the approach mat switch thereby the first binary means produces alternatively high and low voltage outputs, respectively, depending upon whether or not the mat switch is closed or opened.

A second binary output voltage-comparing means having two differential voltage input circuits and an output circuit and which functions like the first binary means has one of its input circuits coupled to the output circuit of the first binary means. A source of direct current voltage of a predetermined value is connected to the other input circuit of the second binary means, the latter selectively responding to the high and low output voltages of the first binary means to switch its output voltages between high and low. Door motor-controlling means is coupled to the output circuit of the second binary means and is responsive to one of the high and low voltages thereof to be in a motor-energizing state and to the other to be in a motor-deenergizing state. The first and second binary means are coupled in such a manner that upon closure of the mat switch the motor-controlling means will be in motor-energizing state and upon the opening thereof, the motor-controlling means will be in said deenergizing state.

A normally open safety mat switch is also in series with said first source of alternating current voltage. A third binary output voltage-comparing means also having two differential voltage input circuits and an output circuit and which functions like the first binary means has applied to the input circuits thereof a third set of two input control voltages of different amplitude in response to the safety mat switch being open and a fourth set reversed in amplitude from the first set in response to the safety mat switch being closed whereby the third binary means produces alternatively high and low voltage outputs, respectively, in response to the closing and opening of the safety mat switch.

A first circuit couples the output circuit of the third binary means to an input circuit of the second binary means for holding the latter in the state that energizes the motor-controlling means when the safety mat switch is closed immediately following opening of the approach mat switch.

Time delay means is utilized for delaying the deenergizing of the motor-controlling means for a predetermined period of time following opening of either of the approach mat and safety mat switches.

It is an object of this invention to provide a control for operating a power operated door wherein alternating current voltage is applied to the approach and safety mat switches.

It is another object of this invention to provide a solid-state logic circuit for controlling the operation of a power operated door.

It is yet another object of this invention to provide a control circuit for power operated doors, which is efficient and reliable in operation and is economical to manufacture and operate.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figures 1, 2:
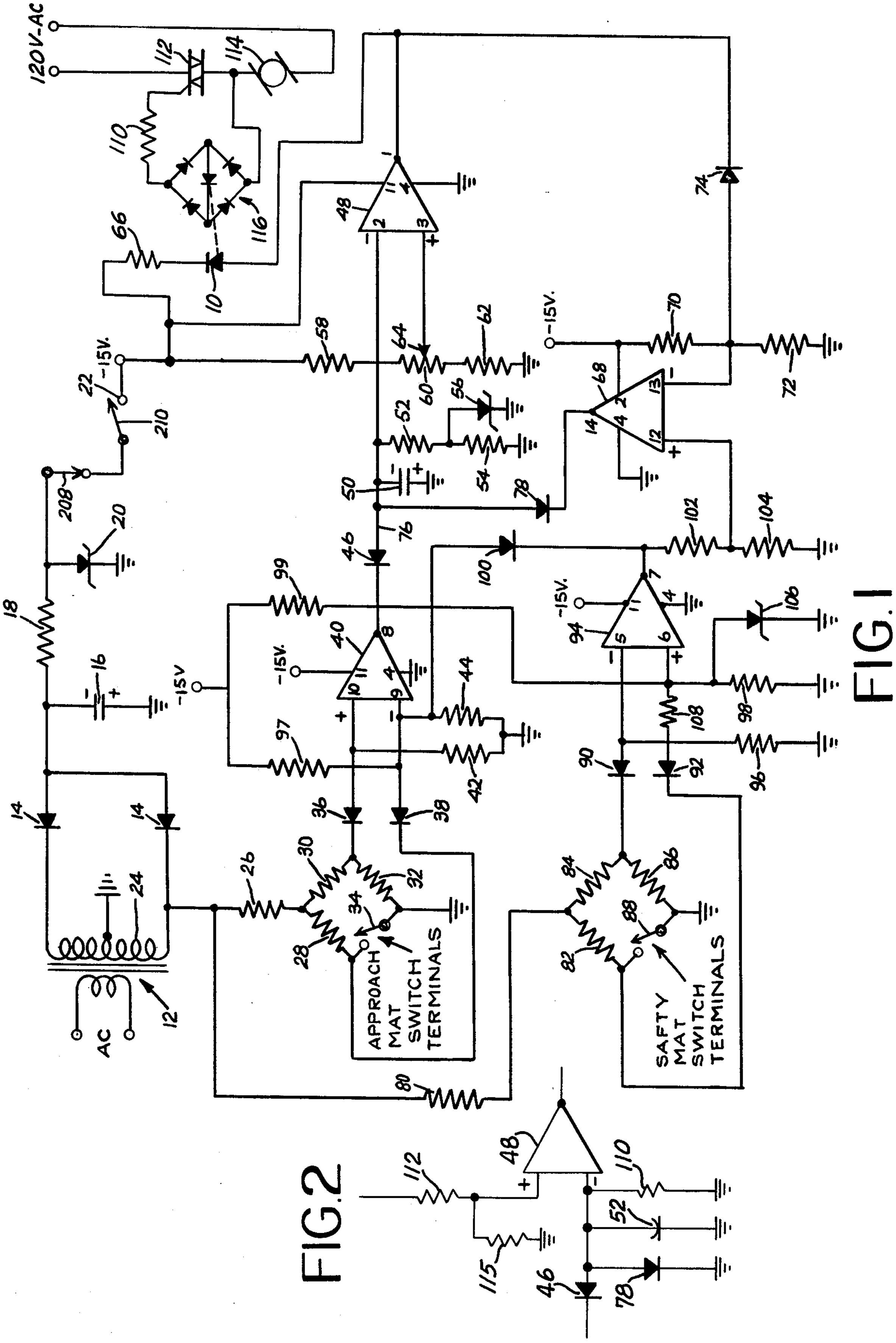
FIG. 1 is a circuit diagram of one embodiment of this invention.
FIG. 2 is a circuit diagram of another embodiment of the time delay portion of the circuit of FIG. 1.

Referring to FIG. 1, the circuit shown controls the opening and closing of a power operated door, whether it be of the sliding or hinged type. For purposes of explaining this invention, it will be assumed that the door is moved to its open position by means of an electric motor 114 and is closed by means of spring tension built up during the opening movement. This is a conventional arrangement and needs no further explanation here.

With respect to energizing the electric motor that operates the door, a light emitting diode 10 in FIG. 1 serves as a part of a photon coupler 116 connected to a triac 112 in turn connected to the electric motor, the motor 114 being energized in response to light emitted by the energized diode 10 and deenergized when the diode 10 is likewise deenergized. The triac 112 becomes conductive upon energization of diode 10 and nonconductive when diode 10 is deenergized. The circuitry of this invention operates to control the energization of the diode 10, hence the opening and closing of the power operated door.

Power for operating this circuitry is derived from the power supply which includes the transformer 12, having its secondary center tapped and grounded as shown, two rectifying diodes 14, a filter capacitor 16, a resistor 18 and a zener diode 20 which provides a −15 volts output at the supply terminal 22. The zener diode 20 is selected to limit the voltage to 15 volts.

In a preferred embodiment of this invention, the secondary winding 24 of the transformer 12 provides about 22 volts rms each side of the center tap. To the lower end of the secondary winding 24 is connected a limiting resistor 26 which in turn is connected to a modified Wheatstone bridge circuit composed of two resistors 28 and 30 of equal value and another resistor 32 of lower value, the remaining leg being in the form of a normally open single pole single throw switch 34. The two resistors 28 and 30 in one embodiment of this invention are selected to be 500 ohms and the resistor 32, 300 ohms. The juncture of the switch 34 and the resistor 32 is grounded as shown.

The switch 34 is the conventional switch which forms a part of the approach mat to the door to be opened. A person stepping on the approach mat causes closure of the switch 34. Upon leaving the mat, the switch 34 spring biases open.

Two diodes 36 and 38 are connected to the opposite corners of the bridge as shown and in turn to the non-inverting and inverting terminals of a differential operational amplifier 40. For this and the other operational amplifiers to be described, the non-inverting terminal will be referred to as the "plus" terminal and the inverting terminal as the "negative" terminal for purposes of convenience. Two resistors 42 and 44 are connected between the "plus" and "negative" terminals and ground as shown. The output terminal of amplifier 40 is connected to a diode 46 which in turn is connected to the "negative" terminal of operational amplifier 48. A charging capacitor 50 is connected between this "negative" terminal and ground in parallel with a voltage divider composed of two resistors 52 and 54. The juncture of these two resistors 52 and 54 is connected to ground via a zener diode 56 having a threshold value of 7.5 volts.

Another voltage divider composed of three resistors 58, 60 and 62 as connected between the supply voltage of −15 volts and ground, the resistor 60 being variable having a slider 64 connected to the "plus" terminal of operational amplifier 48. A limiting resistor 66 is series connected between the light emitting diode 10 and the power source, the light emitting diode 10 also being connected to the output terminal of the operational amplifier 48.

Another operational amplifier 68 has its negative terminal connected to the juncture of the two series connected resistors 70 and 72, these being connected across the source of supply voltage, a diode 74 being connected in the polarity shown between this juncture and the output terminal of the operational amplifier 48. The output terminal of operational amplifier 68 is connected to line 76 leading to the negative terminal of operational amplifier 48 by means of a diode 78.

Referring now to the safety mat switch circuit, it includes a resistor 80 connected to the upper end of resistor 26 and also to a second modified Wheatstone bridge composed of resistors 82 and 84 of value equal to resistors 28 and 30, another resistor 86 equal in value to resistor 32 and the safety mat switch 88 of conventional design and which serves as a part of the safety stepping mat also of conventional design. The switch 88 is normally spring biased open and is closed only by a person stepping on the safety mat. The safety mat is conventionally disposed on the opposite side of the door threshold from the approach mat.

Opposite corners of this latter bridge are connected by means of diodes 90 and 92 to the "plus" and "negative" terminals, respectively, of another differential operational amplifier 94. Resistors 96 and 98 are connected between the "plus" and "negative" terminals and ground as shown.

Connected to the "negative" and plus terminals of the two operational amplifiers 40 and 94 are two resistors 97 and 99, respectively, connected to the power supply source of −15 volts.

The output terminal of the operational amplifier 94 is connected to the "negative" terminal of operational amplifier 40 by means of a diode 100. A voltage divider composed of the two series connected resistors 102 and 104 are connected between ground and this same output terminal. The juncture of this voltage divider is connected to the "plus" terminal of the operational amplifier 68.

The operation of this circuit will now be described. Resistors 28 and 30 and dropping resistor 26 form a divider network assuring that the mat switch 34 will not have applied thereto spark-causing currents, and the operational amplifier 40 will not have applied thereto greater than −15 volts at either of the "plus" or "negative" input terminals. It is desirable that only alternating current voltage be applied to the mat switches 34 and 88 as opposed to direct current to prevent deleterious chemical electrolysis of the switch contacts. Thus the use of alternating current voltage provides greater reliability over the use of direct current. The same is true for the safety mat switch circuit 80, 82, 84, 86, 88.

Since the diodes 36 and 38 on the one hand and diodes 90 and 92 on the other are rectifiers only, the negative-going half cycles of the applied alternating current voltage are coupled to the respective operational amplifier input terminals. In response to the negative half cycles, outputs at the operational amplifiers occur only on each negative half cycle of the input voltage.

The amplifiers 40, 48, 68, and 94 operate as voltage comparators providing binary output signals of high and low voltages. Additionally they serve as high gain switches.

Considering a conventional power operated door having an approach mat on the entry side and a safety mat on the exit side, unless a person steps on either of the mats, the respective mat switches 34 and 88 will remain open. Considering for the moment the approach mat circuitry and assuming that the approach mat switch 34 is open, a higher voltage (the word "higher"

in every instance meaning more negative) appears on the minus terminal of operational amplifier 40 causing the output terminal to be at ground potential. Upon a person stepping on the approach mat, the switch 34 is closed. This results in a higher voltage being applied to the "plus" terminal of the operational amplifier 40, changes its state in a binary sense, thereby providing at the output terminal a higher voltage. It should be stated that all of the operational amplifiers are operated only in a binary mode thereby serving as high gain switches. Such amplifiers may be considered as binary output, voltage comparison devices.

Under idling conditions, that is switches 34 and 88 are open, the operational amplifier 48 has a voltage applied to the plus terminal on the tap 64 which produces a normal high voltage at the output terminal thereof. However, the higher voltage developed at the output terminal of the amplifier 40 coupled to the minus terminal of the operational amplifier 48 by means of the diode 46 triggers this latter amplifier to a state of ground potential at the output terminal. This ground potential is applied to the anode of the light emitting diode 10 causing it to emit light and to cause energization of the motor by means of a conventional photon coupler which starts opening the door.

The higher voltage developed at the output terminal of the operational amplifier 40, appearing on line 76, charges capacitor 50. This capacitor maintains the door-opening voltage on the minus terminal of the operational amplifier 48 during stepping off the approach mat, across the threshold and onto the safety mat unless it is permitted to discharge through the voltage divider and zener diode network 52, 54 and 56. However, so long as the person remains standing on the approach mat, or is stepping across the threshold, door-opening potential will be maintained by virtue of the high voltage on line 76 from amplifier 40 or capacitor 50, as the case may be, on the negative terminal of the operational amplifier 48 and the diode 10 will be energized.

Once the door has opened and the person steps across the threshold, he leaves the approach mat which permits the switch 34 to open and steps on the safety mat which causes closure of the switch 88. This results in a higher voltage being applied to the "plus" terminal of the operational amplifier 94 and a high voltage to be developed at the output terminal thereof. This high voltage is coupled to the "negative" terminal of the operational amplifier 40 by means of the diode 100 which causes reversal of the state of operational amplifier 40, the output terminal switching to ground potential. The approach mat is then said to be inhibited as explained later. Simultaneously, voltage division occurs across the two resistors 102 and 104, a voltage of about −7 volts appearing at the juncture thereof and on the "plus" terminal of the operational amplifier 68. Since the diode 74 is an open circuit when the output terminal of operational amplifier 48 is at ground potential, only about 1.5 volts "negative" appears at the juncture of the two resistors 70 and 72 by reason of the former being of about 100,000 ohms and the latter 10,000 ohms. Thus, a −1.5 volts is applied to the "negative" terminal of the operational amplifier 68. This operational amplifier 68 having a −7 volts on the "plus" terminal is thus switched to a state of high voltage at the output terminal thereof which is coupled to the line 76 by means of the diode 78. This high voltage maintains the capacitor 50 charged and the operational amplifier 48 in the state of ground potential at the output terminal.

When the person steps off the safety mat, the safety mat switch 88 opens and the state of operational amplifier 94 is thus changed to ground potential. Since the capacitor 50 is charged at the time the person steps off the safety mat to open the switch 88, the operational amplifier 48 does not immediately change state whereupon the light emitting diode 10 remains "on". The capacitor 50 now discharges through the resistor-diode network 52, 54 and 56. Since the zener diode 56 has a breakdown voltage of 7.5 volts, and since the maximum charge on the capacitor 50 is at −15 volts, initially the discharge path will be through the resistor 52 and the zener diode 56. Once the charge level on the capacitor 50 drops below −7.5 volts, the zener diode 56 becomes an open circuit and the remainder of the capacitor discharge is through the two series connected resistors 52 and 54. In an operating embodiment of this invention, the resistor 52 is selected to be 300,000 ohms while that of resistor 52 is 430,000 ohms. Since during the initial part of the discharge essentially only resistor 52 provides the discharge path, it will be seen that the discharge rate will be shorter than when the zener diode 56 is nonconductive and the discharge path then includes the resistor 54. The first 7.5 volt discharge of the capacitor 50 is then at a more rapid rate than that of the second 7.5 volts since this second part is through a higher resistance than the earlier part.

Once the charge over the capacitor 50 drops to a predetermined level, as determined by the potential applied to the "plus" terminal of the operational amplifier 48 by means of the tap 64 on the resistor 60, the operational amplifier 48 will change state whereupon the output signal will go high which has the effect of turning "off" the light emitting diode 10. This disconnects the power to the motor which is operating to open the door thereby permitting the built-in return spring to close the door.

The discharge potential of the capacitor 50 which serves to trigger the operational amplifier 48 from ground to high potential (−15 volts) is determined by the setting of the variable resistor 60, 64. When the voltage on the "negative" terminal due to the charge on the capacitor 50 drops below that on the "plus" terminal, the operational amplifier 48 is triggered as just explained.

This same time delay occurs during the time a person is stepping off the approach mat, across the threshold and onto the safety mat.

The resistor 60, 64, preferably a rotary potentiometer, is manually adjustable to determine the time delay following opening of the safety mat switch 88 for turning "off" the light emitting diode 10, or in other words, changing the state of the operational amplifier 48. Since the discharge of the capacitor 50 through the network 52, 54 and 56 is non-linear, being rapid initially and thereafter slowed, the resistor 60, 64 may be adjusted between limits of providing essentially one second time delay up to a maximum of 45 seconds. Between the one second time delay adjustment and moving toward the position of maximum delay, the initial part of the movement of the slider 64 produces only a minimal change in the amount of time delay, with the same degree of movement later providing increased time delay. Thus, with proper selection of the variable resistor 60, 64, the first half of rotational movement of the slider 64 can provide increasing time delays varying substantially linearly from about zero or one second to ten seconds time delay. For the second half of the slider 64 rotation, delay is progressively increased from ten seconds up to fourty-five seconds.

In a preferred embodiment of this invention, the variable resistor 60, 64 is of the conventional, rotary potentiometer type. Since the adjustment covers the first ten seconds of time delay in the first half of the rotational adjustment range, it becomes an easy matter to adjust the slider 64 in this range to pick off the most commonly used short delay periods which conventionally vary from about one to ten seconds.

If this time delay adjustment were linear instead of nonlinear, it will be understood that the first increment of movement of the slider 64 could result in a ten second or more delay such that it would be extremely difficult for an operator minimally to adjust the slider to a position at which he would obtain the precise number of seconds in the range of from one to ten as he would desire. Thus, the non-linear time delay adjustment of this invention provides a facile means for accurately and quickly setting the number of seconds time delay desired.

At this point, reference may be had to FIG. 2 wherein a fixed time delay circuit is shown as consisting of a fixed resistor 110 which would replace the discharge resistor-diode network 52, 54 and 56 as well as the divider 58, 60 and 62 limiting resistors 112 and 115 being connected to the plus terminal of the operational amplifier 48. This arrangement would provide a fixed time delay depending upon the values of the resistors 110, 112 and 115. Otherwise the operation of this circuit is the same as that of FIG. 1.

The circuit of this invention safeguards against improper operation of the door in the event the safety mat switch 88 is closed before closure of the approach mat switch 34. Otherwise stated, safeguard is provided against a person stepping on the safety mat prior to stepping on the approach mat. Assuming this condition, closure of the safety mat switch 88 results in the outpt of operational amplifier 94 going high (−15 volts) which is conducted by diode 100 to the minus terminal of operational amplifier 40. This would result in the state of the output of operational amplifer 40 being at ground potential in which condition this amplifier is said to be inhibited. In other words, stepping on the safety mat before stepping on the approach mat results in inhibiting operation of the approach mat circuitry. Simultaneously, the operational amplifier 48 is in a state in which its output is high (about −13 volts) which is conducted to the minus terminal of the operational amplifier 68 via the diode 74 which is now conductive. Since the output states of both the operational amplifiers 40 and 68 are the same, namely ground potential, the output signal of the operational amplifier 48 will remain high (−13 volts) maintaining light emitting diode 10 disabled. Thus, the door will not be activated under this condition of the safety mat being stepped on prior to the approach mat.

In the unidirectional power supply are two switches 208 and 210 for connecting supply voltage to the system. Switch 208 is the conventional panic switch which is closed by the door beyond the normal travelling limits. Switch 210 is the "on"/"off" system switch and may be operated manually.

In an emergency, with the door closed, a person may step on the safety mat and physically force the door open to an extent which opens switch 208. The system is then deenergized with the door open to permit rapid exiting therethrough, neither the approach nor safety mats having any further affect. This arrangement differs from the prior art wherein an electrical connection to the mat switch is broken upon opening of the panic switch 208: this is not desirable since a failure could occur in such a manner as to provide power to the door in spite of the fact the mat switches are disconnected. This invention cuts the power at a safer and more reliable location.

The switch 208, 210 arrangement provides one access point in a total system whereby "on"/"off", reset and panic operation with low voltage can be expected, reset of the motor-protection circuit being accomplished by cycling the power switch "off" and then "on".

As explained earlier, one of the objects of this invention is to provide AC potential at the mat switches 34 and 88 of low, non-sparking amplitude which will avoid the problems of contact electrolysis experienced in prior art systems in which direct current voltage was applied to the mat switches. A problem in prior art systems that is solved by this invention relates to the contact resistance of the two switches 34 and 88. Experience has shown that due to any number of circumstances, contact resistance increases over a period of time due to corrosion, dirt, wearing and the like. In some instances, if the contact resistance is 300 ohms or less, the switch is considered to be in operable condition. However, in some prior art systems, even though the contact resistance was less than 300 ohms, for example 250 ohms, closure of the switch was found not reliably to cause actuation of the door-operating circuitry. In other instances, it was found that if the resistance exceeded a value of 100 or 200 ohms, the switch could not be used and the switch would have to be replaced. This invention thus permits the use of an otherwise "bad" mat.

As to this invention, many of the problems due to contact resistance in the prior art systems have been solved and furthermore mat switches formerly considered as being unuseable may be used in connection with this invention. In the operating embodiment disclosed in this application, it is considered that any contact resistance up to 300 ohms is useable. The circuit is designed to operate reliably for all contact resistances between zero and substantially 300 ohms. This is accomplished by means of the modified Wheatstone bridge circuits 28, 30, 32 and 82, 84, 86 wherein the resistors 32 and 86 are selected to be 300 ohms which thus establishes the maximum contact resistance of the two mat switches 34 and 88 in the companion legs of the bridge.

Use of the bridge circuits in combination with the differential operational amplifiers of high gain and high input impedance, without the use of any type of feedback loop provides a high gain, sharp resolution toggle circuit in which contact resistance of about 299 ohms has been found to trigger this circuit but a resistance of 302 ohms would not trigger the circuit. Thus, by reason of this sharp resolution, reliability is assured until the contact resistance reaches a value which is too high and at which time requires repair.

By reason of the non-linear time delay adjustment 60, 64, manual selection of a particular time delay becomes simple and easy to select. The circuit is fool proof in that the door cannot be operated by merely stepping on the safety mat without first activating the approach mat, and furthermore once the door is opened, closure thereof will not occur until a time delay after a person leaves either of the mats, thereby avoiding the possibility of the door striking the person upon closure.

While light-emitting diode 10 is shown as the "motor-controlling means" and as a part of a photon coupler 116, it will be understood by persons skilled in the art that other devices may be used instead, such as an electric lamp, a relay type read switch and the like. The motor-energizing circuitry is conventional, containing a photo-sensitive switch, a relay or the like which is activated in response to the "motor-controlling means" to close a motor controlling relay switch to apply power to the motor.

The circuit of this application may be interfaced with the circuit of my application Ser. No. 914,555, filed June 12, 1978, and entitled MOTOR OVERLOAD PROTECTION CIRCUIT, for the purpose of activating and deactivating the curcuit thereof. A part of this activating, circuit is the light-emitting diode 204 and resistor 206 which may form a part of a photo-coupler having a photo-sensitive diode switch in the DC power supply circuit of the above-mentioned application in place of the single pole or single throw manual switch shown therein. While diode 204 is emitting light, the motor protector circuit is activated. If diode 204 extinguishes, because of the opening of one of the two switches 208 or 210, the motor protection circuit will be disabled to prevent energization of the door-opening motor, the manner of deenergizing the door-opening motor being disclosed in my aforesaid application. The photo-coupler may be like that shown at 10, 116 in FIG. 1 hereof.

In the following is listed the values of the components in a working embodiment of this invention, it being understood that these are exemplary only and are not limitative of the invention.

| | |
|---|---|
| Resistors 26, 80 | 1000 ohms |
| Resistors 18, 28, 30, 82, 84, 108 | 510 ohms |
| Resistors 32, 86 | 300 ohms |
| Resistors 42, 44, 72, 96, 98, 102, 104 | 10,000 ohms |
| Resistors 70, 97, 99 | 100,000 ohms |
| Resistors 52 | 300,000 ohms |
| Resistors 54 | 430,000 ohms |
| Resistors 58 | 2,000 ohms |
| Resistors 62 | 2,200 ohms |
| Resistors 66 | 1,200 ohms |
| Resistors 110 | 100 ohms |
| Resistors 60 | 10,000 ohms Bourns 33S5X103 Potentiometer |
| Resistors 206 | 1500 ohms |
| Capacitor 16 | 100 mfd |
| Capacitor 50 | 25 mfd |
| Diodes 14, 36, 38, 90, 92, 46, 74, 78, 100 | PTC-205 Mallory |
| Diodes 20 (zener) | 1N4744 Fairchild |
| Diodes 56 (zener) | IN5236B Fairchild |
| Diodes 10 (light emitting) | 4N40 |
| Diodes 106 (zener) | 1N536B Fairchild |
| Operational amplifiers 40, 48, 68, 94 | LM324N National Semiconductor |
| Triac 112 | Q401515 ECC Teccor |

While there have been described above the principles of this invention in connection with specific apparatus, it is to be clearly understood that this description is made only by way of example and not as a limitation to the scope of the invention.

What is claimed is:

1. Automatic door-controlling apparatus comprising a first source of alternating current voltage, a normally open approach mat switch in series with said source, a first binary output voltage-comparing means having two differential voltage input circuits and an output circuit which generates alternatively high and low output voltages in response to two alternated high and low input control voltages, first voltage means for applying a first set of two input control voltages of different amplitude to said first binary means in response to said switch being open and for applying a second set of two input control voltages of reversed amplitude with respect to said first set in response to closure of said switch, whereby said first binary means produces alternatively high and low voltage outputs, respectively, a second binary output voltage-comparing means having two differential voltage input circuits and an output circuit and which functions like said first binary means, the output circuit of said first binary means being coupled to one of the input circuits of said second binary means, a source of direct current voltage of predetermined value being connected to the other input circuit of said second binary means, said second binary means selectively responding to the high and low output voltages of said first binary means to switch its output voltages between high and low;

motor-controlling means coupled to the output circuit of said second binary means and responsive to one of said high and low voltages thereof to be in a motor-energizing state and to the other to be in a motor-deenergizing state, said first and second binary means being coupled such that upon closure of said mat switch said motor-controlling means will be in said motor-energizing state and upon the opening thereof said motor-controlling means will be in said deenergizing state;

a normally open safety mat switch in series with said first source of voltage, a third binary output voltage-comparing means having two differential voltage input circuits and an output circuit and which also functions like said first binary means, second voltage means for applying a third set of two input control voltages of different amplitude to said third binary means in response to said safety mat switch being open and for applying a fourth set of two input control voltages of reverse amplitudes with respect to said third set in response to said safety mat switch being closed, whereby said third binary means produces alternatively high and low voltage outputs, respectively, and first circuit means coupling the output circuit of said third binary means to an input circuit of said second binary means for holding the latter in the state that energizes said motor-controlling means when said safety mat switch is closed within a predetermined time following opening of the previously closed approach mat switch.

2. The apparatus of claim 1 including time delay means for delaying the deenergizing of said motor-controlling means for said predetermined period of time following opening of either of the approach and safety mat switches.

3. The apparatus of claim 2 in which said first circuit means includes a fourth binary output voltage-comparing means having two differential voltage input circuits and an output circuit and which functions like said first binary means, second circuit means connecting the output circuit of said second binary means to one of the input circuits of the fourth binary means and third circuit means connecting the output circuit of said third binary means to the other input circuit of said fourth binary means for holding said second binary means in a state of energizing said motor-controlling means when said safety mat switch is closed within a predetermined time following opening of the previously closed approach mat switch and for having no control of the state of said second binary means when said safety mat switch is open.

4. The apparatus of claim 1, said first circuit means including inhibit circuit means for holding said second binary means in the state that maintains said motor-controlling means deenergized when said safety mat switch is closed after said approach mat switch has been open for a period longer than said predetermined time.

5. The apparatus for claim 1 wherein said first voltage means includes a modified Wheatstone bridge having resistors in the three legs thereof and said approach mat switch in the fourth leg, the first corner of said bridge at the juncture of two of said resistors being coupled to one side of said first source of alternating current voltage, the second and opposite corner thereof between said approach mat switch and the remaining one of said resistors being connected to the other side of said first source of voltage, the remaining two corners being coupled by means of two rectifiers to the two input circuits, respectively, of said first binary means in such polarity that the output signal of said first binary means corresponds to deenergization of said motor-controlling means when said approach mat switch is open and further changes to correspond to energization of said motor-controlling means when the latter switch is closed, said bridge applying a higher direct current potential to one of said input circuits than to the other of said first binary means when the latter switch is open and a higher direct current potential to the other input circuit when said latter switch is closed.

6. The apparatus of claim 5 wherein the first-mentioned two resistors are of equal value and the third resistor is of lower value.

7. The apparatus of claim 6 wherein said first, second, third and fourth binary means are differential operational amplifiers, the first operational amplifier having a voltage divider circuit connected to the inverting terminal for applying a biasing potential thereto for producing a low signal voltage in the output circuit thereof when said approach mat switch is open, the value of the resistors in said bridge being such as to produce a triggering potential on the non-inverting terminal when the latter switch is closed which changes said low signal voltage to a high signal voltage.

8. The apparatus of claim 7 wherein the output terminal of the first amplifier is coupled to the inverting terminal of the second amplifier by means of a diode having its cathode connected to the first amplifier output terminal, a circuit biasing the non-inverting terminals of said second amplifier to a state of a high signal voltage at the output terminal thereof when the signal voltage at the output terminal of the first amplifier is low, said second amplifier changing state to a low signal voltage at the output terminal when the signal voltage at the output terminal of said first amplifier is high.

9. The apparatus of claim 8 including time delay means for delaying for a predetermined period of time the change of state of said second amplifier from the low to high output signal voltage following the output signal voltage of said first amplifier changing from high to low;

said delay means including a capacitor connected to the inverting terminal of said second amplifier which charges in response to a high output signal voltage at said first amplifier, and a discharge network connected in shunt across said capacitor, said network including two series connected resistors shunt connected across said capacitor and a zener diode connected to the juncture of the last-mentioned resistors and in shunt with one resistor but in series with the other.

10. The apparatus of claim 9 wherein the biasing circuit for the non-inverting terminal of said second amplifier includes a variable resistor having a potential applied thereacross, the slider of said variable resistor being manually adjustable and connected to said non-inverting terminal, whereby the biasing voltage may be adjusted.

11. The apparatus of claim 10 wherein said second voltage means includes a second modified Wheatstone bridge like the first-mentioned one connected in the same manner by means of rectifiers to the third operational amplifier, a diode connected between the output terminal of said third amplifier and the inverting terminal of the first amplifier with the cathode thereof being connected to the last-mentioned output terminal, a voltage divider also being connected between the last-mentioned output terminal and a direct current reference voltage, means biasing the inverting terminal of said third amplifier to provide a low output signal voltage when said safety mat switch is open, the last-mentioned low output voltage being switched to high in response to closing of said safety mat switch which results in a high voltage being applied to the non-inverting terminal of said third amplifier, the high output signal voltage from said third amplifier being conducted to the inverting terminal of said first amplifier thereby holding the latter in a state which results in a low output signal voltage, whereby the closing of said approach mat switch is rendered ineffectual in the instance in which the motor-controlling device is deenergized and said safety mat switch is closed before said approach mat switch is closed.

12. The apparatus of claim 11 wherein the non-inverted terminal of the fourth operational amplifier is connected to the last-mentioned voltage divider between the ends thereof, the inverting terminal of said fourth amplifier being connected to the output terminal of said second amplifier by means of a diode connected in such polarity as to conduct the high voltage output signal from said second amplifier to said fourth amplifier inverting terminal but to be non-conductive when the second amplifier output signal voltage is low, a biasing voltage divider connected across a source of direct current voltage and having a connection to said inverting terminal of said fourth amplifier to trigger said fourth amplifier to a state which results in a low output signal voltage, the high signal output voltage from said third amplifier being coupled to the non-inverting terminal of said fourth amplifier via said last-mentioned voltage divider thereby switching the state thereof to a high signal output voltage when said biasing voltage divider has previously controlled said fourth amplifier to produce a low signal output voltage, a diode connected between the output terminal of said fourth amplifier to the inverting terminal of said second amplifier to conduct the high signal output voltage of said fourth amplifier but to provide an open circuit when the latter signal voltage is low.

13. The apparatus of claim 12 wherein said motor-controlling means includes a light-emitting diode connected to the output terminal of said second amplifier.

14. The apparatus of claim 4 wherein said source of direct current voltage has a switching circuit connected therein for selectively applying direct current supply voltage to said first and second binary switches, said switching circuit including a door-operated panic switch that is normally closed in series with a power switch, the opening of either switch disconnecting said source of direct current voltage from said first and second binary switches thereby disabling the same, for conditioning said motor-controlling means to a deenergized state.

15. The apparatus of claim 14 including a motor-protecting switch connected in series with said panic and power switches to have power thereto severed upon the opening of either of the latter mentioned two switches.

16. The apparatus of claim 15 wherein said motor-protecting switch includes a light-emitting diode and a series connected current-limiting resistor which are connected across said source of direct current voltage only when said two switches are closed.

* * * * *